United States Patent
Xu et al.

(10) Patent No.: US 6,995,478 B2
(45) Date of Patent: Feb. 7, 2006

(54) GAS TURBINE ENGINE STARTER GENERATOR THAT SELECTIVELY CHANGES THE NUMBER OF ROTOR POLES

(75) Inventors: Mingzhou Xu, Tucson, AZ (US); Wei Chen, Tucson, AZ (US); Michael W. Duddeck, Tucson, AZ (US); Wayne T. Pearson, Tucson, AZ (US); William M. Scherzinger, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/118,942

(22) Filed: Apr. 28, 2005

(65) Prior Publication Data

US 2005/0206352 A1    Sep. 22, 2005

Related U.S. Application Data

(63) Continuation of application No. 10/391,353, filed on Mar. 17, 2003, now abandoned.

(51) Int. Cl.
*H02P 9/44* (2006.01)
(52) U.S. Cl. ............................ 290/52; 290/46; 322/89; 322/90; 307/29
(58) Field of Classification Search .................. 322/14, 322/89, 90; 290/40 C, 46, 52; 307/29
See application file for complete search history.

(56) References Cited

U.S. PATENT DOCUMENTS

| | | | |
|---|---|---|---|
| 599,932 A | 3/1898 | Frankenfield | |
| 2,726,361 A | 12/1955 | Ringland | |
| 3,590,262 A | 6/1971 | Sheffield et al. | |
| 3,809,914 A | 5/1974 | Kilgore et al. | |
| 4,072,880 A | 2/1978 | Oshima et al. | |
| 4,219,739 A | 8/1980 | Greenwell | |
| 4,459,532 A | 7/1984 | Schutten et al. | |
| 4,675,591 A | 6/1987 | Pleiss | |
| 5,083,077 A * | 1/1992 | Wallace et al. | ............... 322/32 |
| 5,103,153 A | 4/1992 | Droho | |
| 5,418,436 A | 5/1995 | Apuzzo | |
| 5,455,885 A | 10/1995 | Cameron | |
| 5,537,020 A | 7/1996 | Couture et al. | |

(Continued)

FOREIGN PATENT DOCUMENTS

DE    44 12 098 A1    10/1995

(Continued)

*Primary Examiner*—Nicholas Ponomarenko
(74) *Attorney, Agent, or Firm*—Ingrassia Fisher & Lorenz

(57) ABSTRACT

A rotating electrical machine, such as an aircraft starter-generator, that may be operated in either a motor mode or an generator mode. The machine includes a main rotor that is selectively configurable as an M-pole rotor or an N-pole rotor. The machine can also include DC brushes that are selectively moveable into, and out of, electrical contact the main rotor, to thereby electrically couple and decouple a DC power source to and from, respectively, the rotor windings.

28 Claims, 5 Drawing Sheets

U.S. PATENT DOCUMENTS

| | | | |
|---|---|---|---|
| 5,578,880 A * | 11/1996 | Lyons et al. | 310/90.5 |
| 5,594,322 A * | 1/1997 | Rozman et al. | 322/10 |
| 5,650,707 A | 7/1997 | Lipo et al. | |
| 6,018,200 A * | 1/2000 | Anderson et al. | 290/40 B |
| 6,025,693 A | 2/2000 | Smith | |
| 6,323,625 B1 * | 11/2001 | Bhargava | 322/32 |
| 6,489,692 B1 * | 12/2002 | Gilbreth et al. | 290/52 |
| 6,605,928 B2 * | 8/2003 | Gupta et al. | 322/10 |
| 6,628,005 B2 * | 9/2003 | Nelson et al. | 290/40 C |
| 6,664,653 B1 * | 12/2003 | Edelman | 290/52 |
| 6,768,278 B2 * | 7/2004 | Xu et al. | 318/140 |
| 6,906,479 B2 * | 6/2005 | Xu et al. | 318/140 |

FOREIGN PATENT DOCUMENTS

| | | |
|---|---|---|
| DE | 195 05 061 A1 | 12/1995 |
| WO | WO 2004/084386 A1 | 9/2004 |

* cited by examiner

GAS TURBINE ENGINE STARTER GENERATOR THAT SELECTIVELY CHANGES THE NUMBER OF ROTOR POLES

CROSS-REFERENCE TO RELATED APPLICATIONS

This application is a continuation of U.S. application Ser. No. 10/391,353, filed Mar. 17, 2003, now abandoned.

FIELD OF THE INVENTION

The present invention relates to rotating electrical machines such as starter generators for gas turbine engines and, more particularly, to a starter generator that selectively changes the number of rotor poles between operation as a DC motor and an AC generator.

BACKGROUND OF THE INVENTION

An aircraft may include various types of rotating electrical machines such as, for example, generators, motors, and motor/generators. Motor/generators are used as starter-generators in some aircraft, since this type of rotating electrical machine may be operated in both a motor mode and a generator mode. A starter-generator may be used to start the engines or auxiliary power unit (APU) of an aircraft when operating as a motor, and to supply electrical power to the aircraft power distribution system when operating as a generator. Thus, when operating as a motor, a starter-generator may be used to start the engines.

One particular type of aircraft starter-generator includes three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating as a generator. Conversely, if the starter-generator is operating as a motor, the control device supplies AC power.

If the starter-generator is operating in generator mode, DC current from the regulator or control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating motor mode, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

The above-described starter-generator may include relatively complex and heavy power electronics circuits in the control device. For example, some control devices may include inverters, for converting DC to AC power, rectifiers, for converting AC power to DC power, and potentially complex voltage and frequency control circuits. Although brush-type DC machines may alleviate the need for some of these complex and heavy electronic circuits, these also suffer certain drawbacks. For example, the brushes tend to wear fairly quickly, which can reduce machine reliability and increase the need for periodic maintenance and cleaning. Some brush-type DC machines can also suffer what is known as torque ripple during startup. In some instances, the torque ripple can be large, which can result in poor starter performance.

Hence, there is a need for a starter-generator that does not rely on relatively complex and heavy inverters and frequency control circuits for proper operation, and/or does not suffer reduced reliability from brush wear, and/or the need for potentially frequent maintenance and cleaning, and/or does not experience significant torque ripple during startup. The present invention addresses one or more of these needs.

SUMMARY OF THE INVENTION

The present invention provides a starter-generator that does not incorporate relatively complex power conversion and frequency control circuits, which reduces the weight and cost as compared to some current starter-generators. The starter-generator can increase the wear life of its DC brushes, which reduces cleaning and maintenance, and the starter-generator can provide a relatively smooth startup, which improves performance during startup.

In one embodiment, and by way of example only, a gas turbine engine starter-generator includes a housing, a main stator, and a main rotor. The main stator is mounted within the housing. The main rotor is mounted within the housing, is located at least partially within at least a portion of the main stator, and is selectively configurable as either an M-pole rotor or an N-pole rotor.

In another exemplary embodiment, a gas turbine engine starter-generator includes a housing, a shaft, a main rotor, a main stator, a plurality of main rotor windings, and a switch. The shaft is rotationally mounted within the housing. The main rotor is mounted on the shaft. The main stator is mounted within the housing and is located at least partially around at least a portion of the main rotor. The plurality of main rotor windings are wound around at least a portion of the main rotor. The switch is electrically coupled between selected ones of the main rotor windings and has at least a first position and a second position. When in the first position, the switch electrically couples the main rotor windings such that the main rotor is configured as an M-pole rotor and, when in the second position, electrically couples the main rotor windings such that the main rotor is configured as an N-pole rotor.

In yet another exemplary embodiment, a rotor for a gas turbine engine starter-generator includes a main rotor body and a plurality of rotor coils that are wound around at least a portion of the main body. The rotor coils are wound in a configuration that allows the rotor to be selectively configured as an M-pole rotor or an N-pole rotor.

In still another exemplary embodiment, a motor/generator including a stator having a plurality of stator windings wound around at least a portion thereof and a rotor having a plurality of rotor windings wound around at least a portion thereof, is operated by a method that includes electrically coupling at least a portion of the rotor windings together such that the main rotor is configured as an N-pole rotor. DC power is supplied to the electrically coupled rotor windings and to the stator windings, to thereby operate the motor/generator as a DC motor. At least a portion of the rotor windings are electrically coupled together such that the main rotor is configured as an M-pole rotor, and DC power is no longer supplied to the stator windings, to thereby operate the motor/generator as an AC generator.

Other independent features and advantages of the preferred starter-generator will become apparent from the following detailed description, taken in conjunction with the accompanying drawings which illustrate, by way of example, the principles of the invention.

DETAILED DESCRIPTION OF A PREFERRED EMBODIMENT

Figure 1:
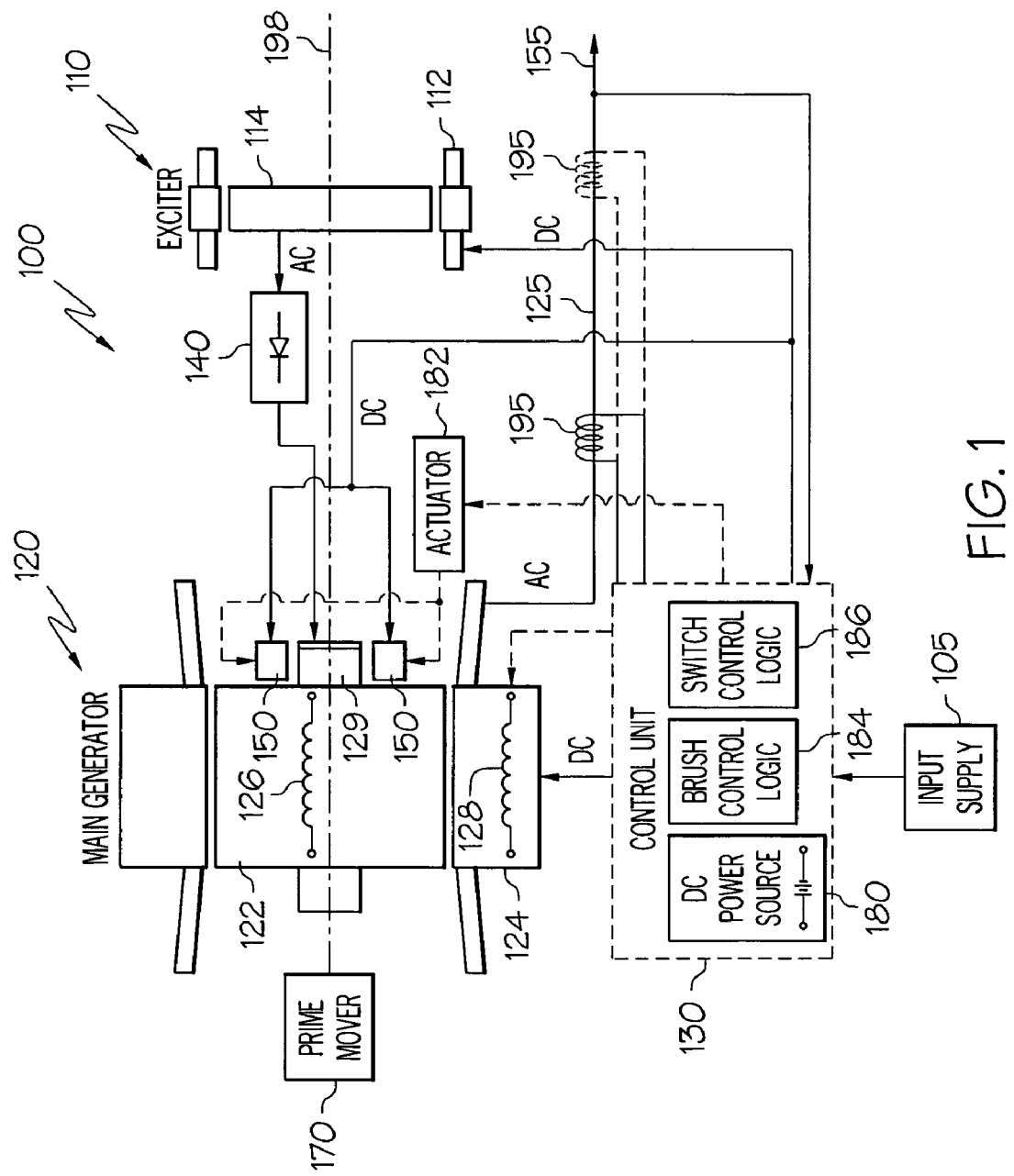
FIG. 1 is a simplified schematic block diagram of an exemplary high speed starter-generator system according to an embodiment of the invention.

A functional schematic block diagram of one embodiment of a motor/generator system 100 is shown in FIG. 1. This exemplary motor/generator system 100 includes an exciter 110, a main motor/generator 120, a motor/generator control unit 130, one or more rectifier assemblies 140, and one or more pairs of brushes 150. It is noted that the motor/generator system 100 may be used as a starter-generator for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating in generator mode, a rotor 122 of the main motor/generator 120, as will be described more fully below, is configured as an M-pole rotor, and the brushes 150 are preferably moved out of physical contact with the main motor/generator rotor 122. The motor/generator control unit 130, which is coupled to receive power from an input supply source 105, supplies DC power to a stator 112 of the exciter 110, but is configured so that DC power is not supplied to a stator 124 of the main motor/generator 120. A prime mover 170 such as, for example, a gas turbine engine, rotates both a rotor 114 of the exciter 110 and the main motor/generator rotor 122. As the exciter rotor 114 rotates, it generates and supplies AC power to the rectifier assemblies 140. The output from the rectifier assemblies 140 is DC power and is supplied to a plurality of rotor windings 126 wound on the main motor/generator rotor 122. As a result, AC power is output from stator windings 128 wound on the main motor/generator stator 124.

During its operation in generator mode, the motor/generator system 100 is capable of supplying output power at a variety of frequencies. Alternatively, a gearing system may be used to operate the motor/generator at a constant speed and, thus, supply a constant frequency. The output power from the main motor/generator stator 124 is typically three-phase AC power. One or more stator output leads 125 supplies the generated AC power to external systems and equipment via one or more terminal assemblies 155. The motor/generator control unit 130 can regulate the power output based upon monitoring signals provided to it from monitoring devices 195. In the depicted embodiment, the exciter 110 and the main motor/generator 120 both rotate along a single axis 198 at the same rotational speed. It will be appreciated, however, that in other embodiments the exciter 110 may rotate along a different axis. Moreover, the relative positioning of the exciter 110 and the main motor/generator 120 can be modified in different embodiments such that the exciter 110 is physically located on the other side of the main motor/generator 120.

Figure 2:
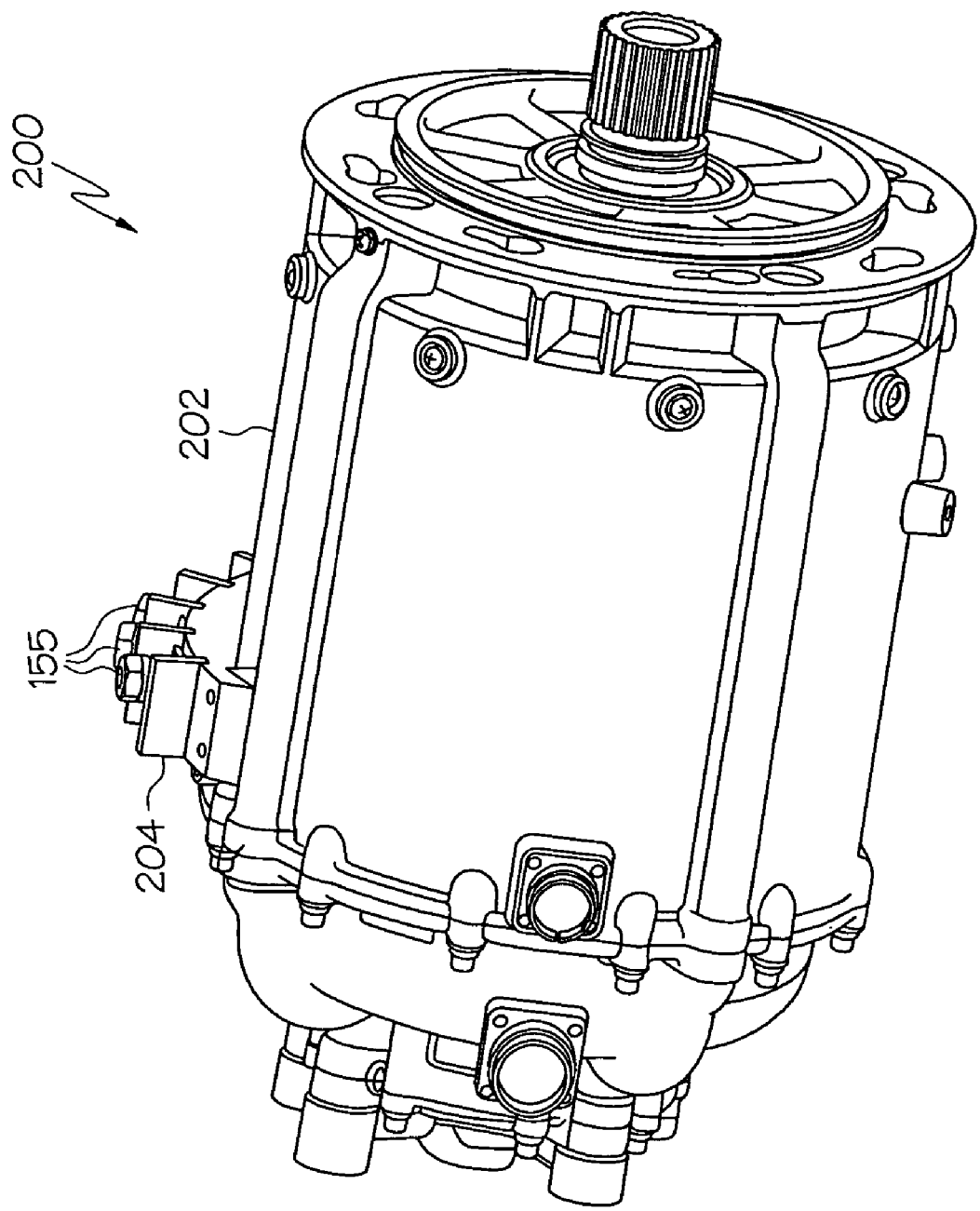
FIG. 2 is a perspective view of a physical embodiment of the starter-generator system depicted in FIG. 1.

When the motor/generator system 100 is operating in motor mode, the main motor/generator rotor 122 is configured as an N-pole rotor, and the brushes 150 are moved into physical contact with the main motor/generator rotor 122. A DC power source 180, which is electrically coupled to the brushes 150, supplies DC power to the main motor/generator rotor windings 126, via a commutator 129. The control unit 130 is additionally configured to supply DC power to the main motor/generator stator windings 128, and no longer supply the DC power to the exciter stator 112. It should be appreciated that the DC power that is supplied to the main motor/generator stator windings 128 may come from the same, or a separate, DC power source that supplies the brushes 150. In any case, as a result of this configuration, the main motor/generator rotor 122 is rotated, supplying rotational power to, for example, the gas turbine engine 170. In the depicted embodiment, the brushes 150 are moved in to, and out of, contact with the main motor/generator rotor 122 using an actuator 182, which is controlled using, for example, brush control logic 184. In the depicted embodiment, the brush control logic 184 is located in the control unit 130, though it will be appreciated that it could be located elsewhere. It will additionally be appreciated that the actuator may be any one of numerous known types of actuators including, but not limited to, electrical, pneumatic, and hydraulic actuators. A perspective view of an exemplary physical embodiment of at least those portions of the motor/generator system 100 that are mounted within a housing 200 is illustrated in FIG. 2.

Figure 3:
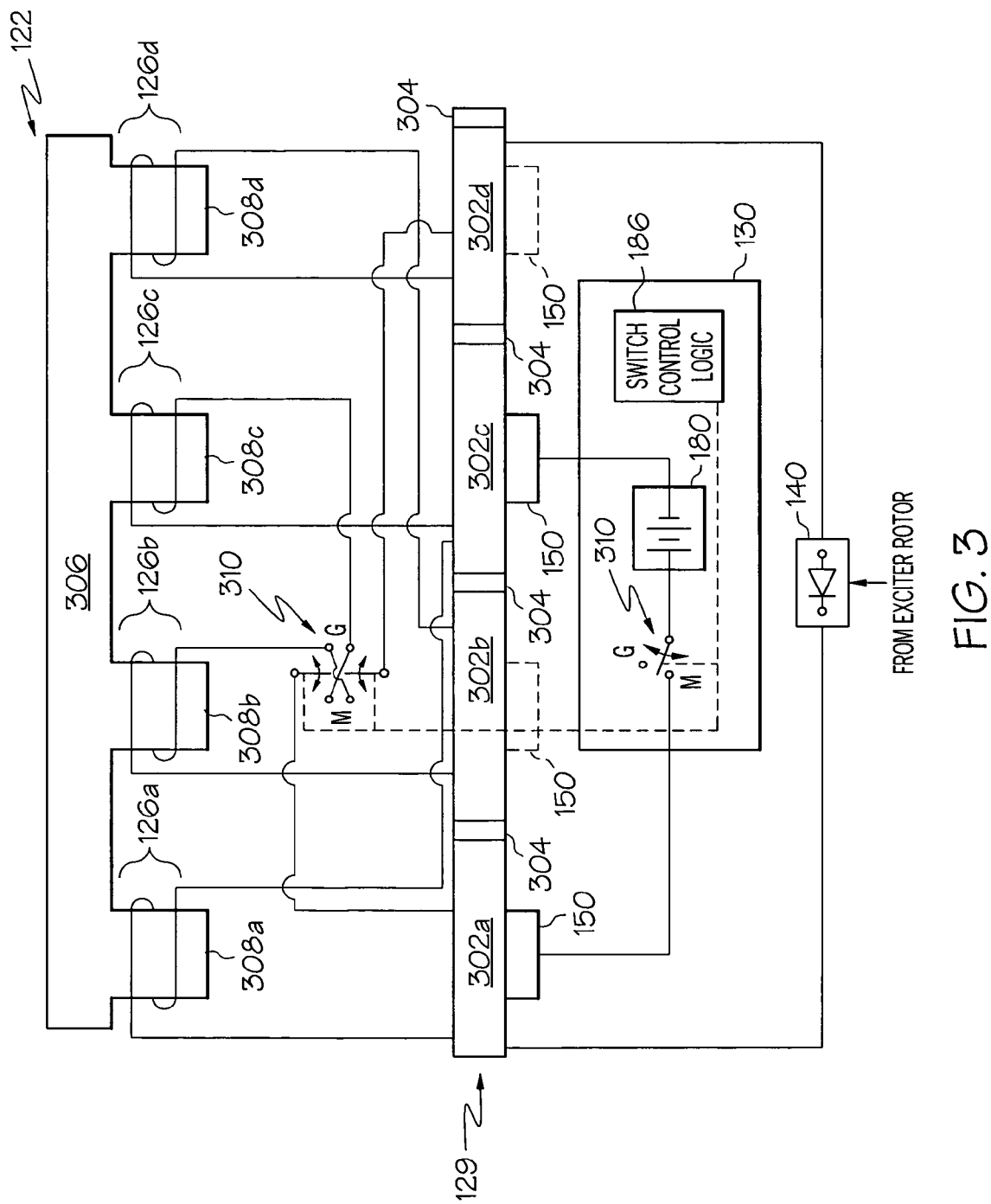
FIG. 3 is simplified representation of a main rotor that may be used in the starter-generator of FIGS. 1 and 2, which schematically depicts various interconnections to the main rotor according to an exemplary embodiment of the present invention.

Turning now to FIG. 3, a simplified representation of the main motor/generator rotor 122, schematically depicting various switched interconnections between the plurality of main motor/generator rotor windings 126, is shown. It will be appreciated that the rotor 122 and commutator 129 are typically cylindrical in shape; however, for clarity and ease of explanation, each is shown in a flat, linear configuration. The commutator 129 includes a plurality of commutator segments 302a–d that are separated from one another by electrical insulators 304. A pair of the moveable brushes 150 is shown using both solid lines and dotted lines. The dotted lines are included to illustrate that the brushes 150, when in contact with the commutator 129, will contact each of the commutator segments 302a–d in turn, as the main motor/generator rotor 122 rotates.

The main motor/generator rotor 122 includes a main body 306. A plurality of pole segments 308a–d, around which individual ones of the rotor windings 126a–d are respectively wound, extend from the rotor main body 306. The rotor windings 126a–d are then electrically coupled, as described more fully below, to generate desired magnetic field polarities in each of the pole segments 308a–d when current flows through the rotor windings 126a–d. It is noted that, for clarity, only a single turn of each of the individual rotor windings 126a–d is shown on each pole segment 308a–d. However, it will be appreciated that more than one turn of rotor winding 126a–d may be wound on each pole segment 308a–d.

In the depicted embodiment, the two rotor windings 126a and 126d that are wound around pole segments 308a and 308d, respectively, are electrically coupled in series between two commutator segments 302. Specifically, rotor winding 126a is electrically coupled in series between commutator segments 302a and 302c, and rotor winding 126d is electrically coupled in series between commutator segments 302b and 302d. The remaining two rotor windings, 126b and 126c, which are wound around pole segments 308b and 308c, respectively, are each electrically coupled in series between a single commutator segment 302 and a switch 310. Specifically, rotor winding 126b is electrically coupled in series between commutator segment 302b and switch 310, and rotor winding 126c is electrically coupled in series between commutator segment 302c and switch 310.

Switch 310 has at least two positions, a motor position (M) and a generator position (G). In FIG. 3, however, the switch 310 is shown in a transition state between the two positions. In the motor position (M), switch 310 electrically couples rotor winding 126b in series between commutator segments 302b and 302d, and rotor winding 126c between commutator segments 302a and 302c. Conversely, in the generator position (G), switch 310 electrically couples rotor winding 126b in series between commutator segments 302a and 302b, and rotor winding 126c between commutator segment 302c and 302d. As FIG. 3 also shows, switch 310 also electrically couples the DC power source 180 in series between a pair of the moveable brushes 150 when in the motor position (M), and removes the DC power source 180 when in the generator position (G). Although shown as being separate wafers of the same switch, it will be appreciated that switch 310 could be implemented as a plurality of individual switches. The switch 310 is remotely controlled by switch control logic 186, which may be located in the control unit 130. However, it will be appreciated that the switch control logic 186 may be located elsewhere. It should further be appreciated that the switch 310 may be any one of numerous controllable switch types including, but not limited to, a mechanical switch, a relay, and various types of transistors. It should additionally be appreciated that the switch 310 may be physically located within the controller 130 or external thereto, as shown in FIG. 3.

With the above-described electrical interconnection scheme, the main motor/generator rotor 122 may be selectively configured as either a 4-pole rotor and a 2-pole rotor. The specific electrical interconnections for these two different configurations will now be described. Before doing so, however, it is to be appreciated that the rotor structure and electrical interconnection scheme depicted and described is merely exemplary of one that may be used to provide a 4-pole/2-pole rotor combination, and that the rotor structure and electrical interconnection scheme can be modified to provide any one of numerous M-pole/N-pole rotor combinations.

Figure 4:
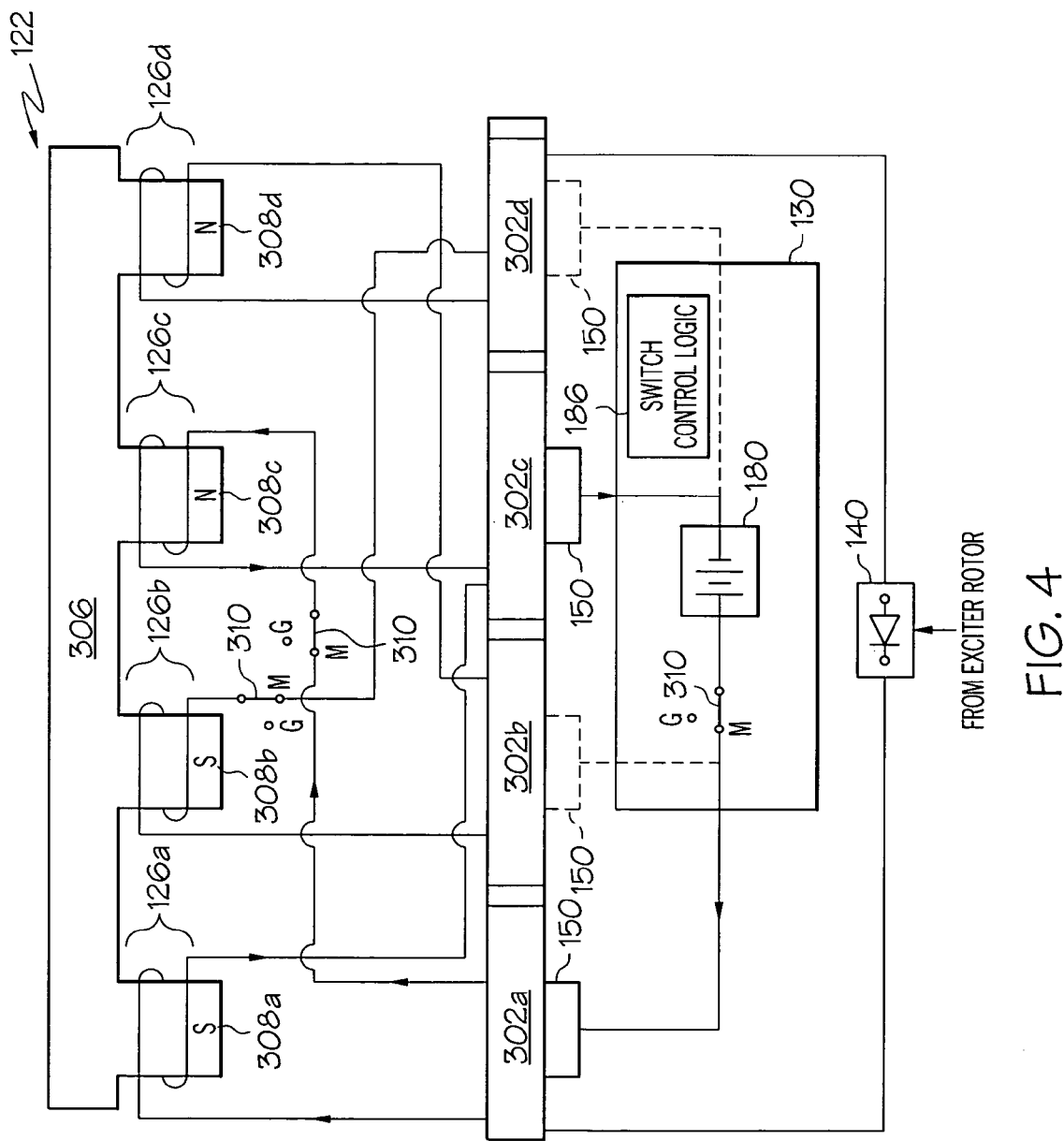
FIG. 4 is a simplified representation of the main rotor, similar to that shown in FIG. 3, with the rotor windings electrically connected so that the main rotor is configured as an N-pole rotor during operation of the starter-generator system in a motor mode.

Referring first to FIG. 4, the configuration of the main motor/generator rotor 122 during operation of motor/generator system 100 in motor mode is shown. In the motor mode, the switch 310 is in the motor position (M), and the main motor/generator rotor 122 is configured as a 2-pole rotor. Specifically, as was noted above, with the switch 310 in the motor position (M), rotor winding 126b is electrically coupled in series between commutator segments 302b and 302d, and rotor winding 126c is electrically coupled in series between commutator segments 302a and 302c. In the motor position (M), the DC power source 180 is also electrically coupled in series between the pair of moveable brushes 150, which are moved into physical contact with the commutator 129. As was also noted above, when the motor/generator system 100 is operating in motor mode, the control unit 130 is configured to no longer supply DC power to the exciter stator 112. Thus, no power is supplied to the commutator 129 via the rectifiers 140.

With the configuration shown in FIG. 4, current flows from the DC power source 180, through one of the brushes 150 and commutator segment 302a, through rotor winding 126a and rotor winding 126c, back through another one of the brushes 150 and commutator segment 302c, and back to the DC power source 180. This flow of current generates a south magnetic pole in pole segment 308a and a north magnetic pole in pole segment 308c. It is noted that at the point in time depicted in FIG. 4, commutator segments 302b and 302d are not electrically coupled to receive power from the DC power source 180, and no current flows through rotor windings 126b and 126d. Thus, the main motor/generator rotor 122 is configured as a 2-pole rotor.

However, it should be appreciated that as the commutator 129 rotates, the brushes 150 will move into contact with commutator segments 302b and 302d, and out of contact with commutator segments 302a and 302c. When this occurs, current flows from the DC power source 180, through commutator segment 302b, through rotor winding 126b and rotor winding 126d, through commutator segment 302d, and back to the DC power source 180. The main motor/generator rotor 122 is still configured as a 2-pole rotor, but in this instance, the flow of current generates a south magnetic pole in pole segment 308b and a north magnetic pole in pole segment 308d. Because commutator segments 302a and 302c, at this point in time, are not electrically coupled to receive power from the DC power source 180, no current flows through rotor windings 126a and 126c. This configuration is shown in phantom FIG. 4.

Figure 5:
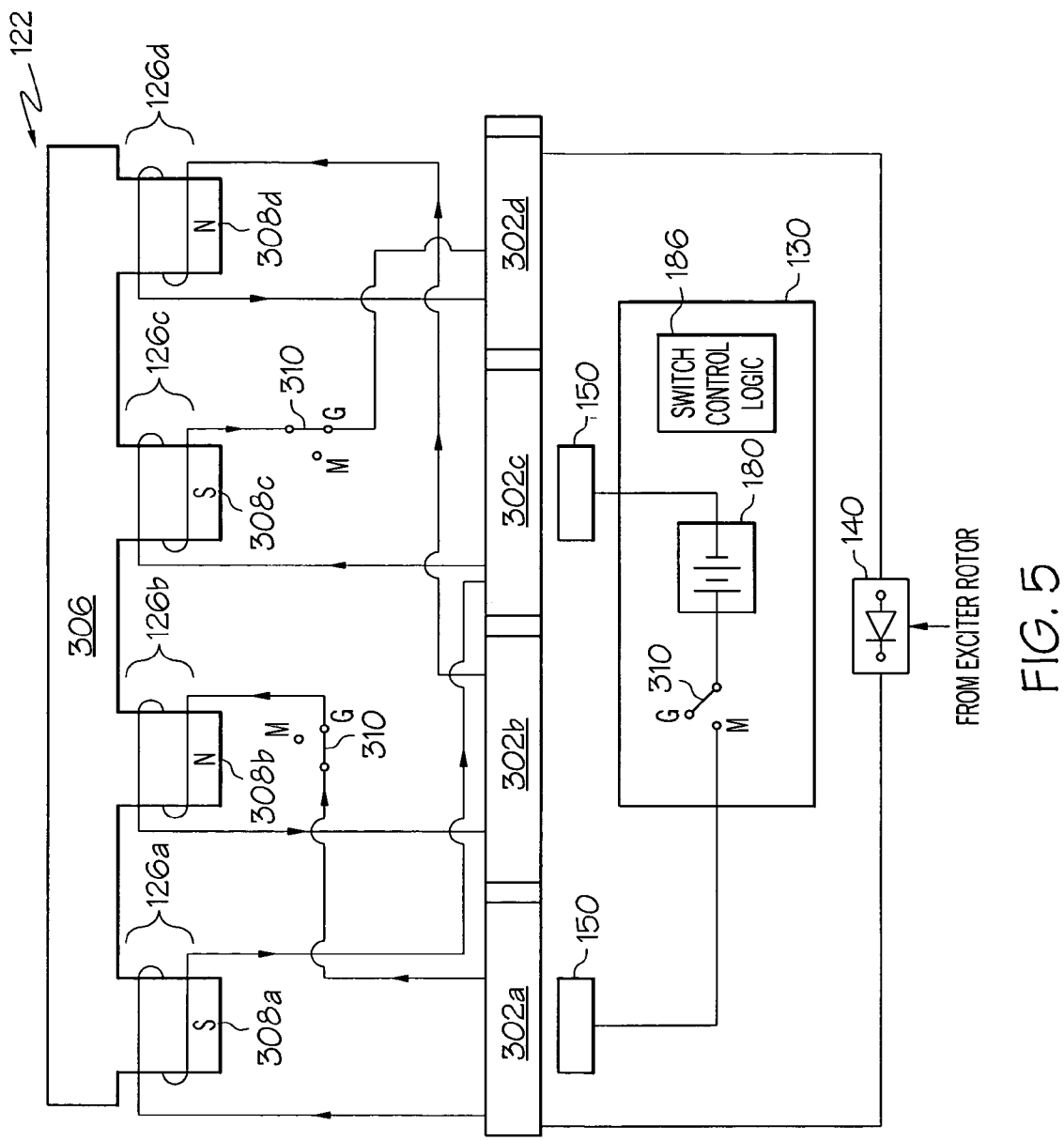
FIG. 5 is a simplified representation of the main rotor, similar to that shown in FIG. 3, with the rotor windings electrically connected so that the main rotor is configured as an M-pole rotor during operation of the starter-generator system in a generator mode.

Turning now to FIG. 5, the configuration of the main motor/generator rotor 122 during operation of motor/generator system 100 in generator mode is shown. In generator mode, the switch 310 is in the generator position (G), and the main motor/generator rotor 122 is configured as a 4-pole rotor. Specifically, as was noted above, with the switch 310 in the generator position (G), rotor winding 126b is electrically coupled in series between commutator segments 302a and 302b, and rotor winding 126c is electrically coupled in series between commutator segment 302c and 302d. In the generator position (G), the DC power source 180 is also electrically decoupled from the pair of moveable brushes 150, which are moved out of physical contact with the commutator 129. As was also noted above, when the motor/generator system 100 is operating in generator mode, the control unit 130 is configured to supply DC power to the exciter stator 112. Thus, DC power is supplied to the commutator 129 via the rectifiers 140.

With the configuration shown in FIG. 5, current flows from the rectifiers 140, through commutator segment 302a, rotor winding 126a, commutator segment 302c, rotor winding 126c, and through commutator segment 302d back to the rectifiers 140. The current flow through commutator segment 302a also flows through rotor winding 126b, commutator segment 302b, rotor winding 126d, and through commutator segment 302d back to the rectifiers 140. This flow of current generates south magnetic poles in pole segments 308a and 308c, and north magnetic poles in pole segments 308b and 308d. Thus, the main motor/generator rotor 122 is configured as a 4-pole rotor.

Typically, when the motor/generator system 100 is being implemented as an aircraft starter-generator, the aircraft is on the ground and the starter-generator is initially operated in a DC motor mode. To do so, the switch 310 is moved to the motor position (M), the control unit 130 is configured so that DC power is not supplied to the exciter stator 112, and the brushes 150 are moved into contact with the main rotor 122. Thus, the main rotor 122 is configured as a 2-pole rotor, the DC power source 180 supplies DC excitation power to the stator windings 128, and to the rotor windings 126 via the brushes 150. The rectifiers 140 inhibit the DC power supplied to the brushes 150 from reaching the exciter stator 112. The flux interaction between the rotor windings 126 and the stator windings 128, and the commutation provided by the DC brushes 150 and commutator 129, gives rise to rotor 122 rotation.

When the rotational speed of the rotor 122 reaches a predetermined magnitude and is increasing, the motor/generator system 100 switches to operation in a generator mode. To do so, the switch control logic 186 automatically moves the switch 310 to the generator position (G), and the control unit 130 is configured to supply DC power to the exciter stator 112. In addition, the brush control logic 184 causes the actuator 182 to move the brushes 150 out of contact with the rotor 122. The AC power output from the exciter stator 112 is rectified by the rectifiers 140, and is supplied to the main rotor 122, which is configured as a 4-pole rotor.

It will be appreciated that the predetermined rotational speed at which operation switches from the motor mode to the generate mode may vary, depending on the type of engine that is being started. It will additionally be appreciated that this is only exemplary of a particular preferred embodiment, and that the motor/generator 100 could also be switched based on other operational needs, such as, for example, a specified time period after it begins operating in motor mode.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine starter-generator, comprising:
   a housing;
   a main stator mounted within the housing; and
   a main rotor mounted within the housing and located at least partially within at least a portion of the main stator, the main rotor selectively configurable as either an M-pole rotor or an N-pole rotor.

2. The starter-generator of claim 1, further comprising:
   a control circuit electrically coupled to at least the main rotor and operable to selectively configure the main rotor as the M-pole rotor or the N-pole rotor.

3. The starter-generator of claim 2, further comprising:
   a plurality of windings wound on at least a portion of the main rotor; and
   a switch electrically coupled between selected ones of the main rotor windings, the switch having at least a first position and a second position,
   wherein the main stator is configured as the M-pole rotor with the switch in the first position, and is configured as the N-pole stator with the switch in the second position.

4. The starter-generator of claim 3, wherein the control circuit comprises:
   switch control circuitry operable to move the switch between at least the first position and the second position.

5. The starter-generator of claim 1, further comprising:
   at least two brushes adapted to electrically couple to a DC power source and selectively moveable into, and out of, electrical contact with at least a portion of the main rotor, whereby the brushes are electrically coupled to, and decoupled from, respectively, the main rotor windings.

6. The starter-generator of claim 1, further comprising:
   an exciter rotor mounted on the shaft;
   an exciter stator having a plurality of windings wound thereon, the exciter stator mounted within the housing and located at least partially around at least a portion of the exciter rotor; and
   at least one rectifier assembly electrically coupled in series between the exciter stator windings and the main rotor windings.

7. The starter-generator of claim 1, wherein M is unequal to N.

8. The starter-generator of claim 7, wherein N=(M/2).

9. A gas turbine engine starter-generator, comprising:
   a housing;
   a shaft rotationally mounted within the housing;
   a main rotor mounted on the shaft;
   a main stator mounted within the housing and located at least partially around at least a portion of the main rotor;
   a plurality of main rotor windings wound around at least a portion of the main rotor; and
   a switch electrically coupled between selected ones of the main rotor windings and having at least a first position and a second position,
   wherein the switch, when in the first position, electrically couples the main rotor windings such that the main rotor is configured as an M-pole rotor and, when in the second position, electrically couples the main rotor windings such that the main rotor is configured as an N-pole rotor.

10. The starter-generator of claim 9, further comprising:
    a control circuit operable to selectively move the switch between the first and second positions.

11. The starter-generator of claim 10, wherein the control circuit includes:
    switch control circuitry operable to selectively move the switch between the first and second positions.

12. The starter-generator of claim 11, further comprising:
a plurality of main stator windings wound on at least a portion of the main stator, each of the main stator windings adapted to selectively electrically couple to a DC power source.

13. The starter-generator of claim 9, further comprising:
at least two brushes adapted to electrically couple to a DC power source and selectively moveable into, and out of, electrical contact with at least a portion of the main rotor, whereby the brushes are electrically coupled to, and decoupled from, respectively, the main rotor windings.

14. The starter-generator of claim 9, further comprising:
an exciter rotor mounted on the shaft;
an exciter stator having a plurality of windings wound thereon, the exciter stator mounted within the housing and located at least partially around at least a portion of the exciter rotor; and
at least one rectifier assembly electrically coupled in series between the exciter stator windings and the main rotor windings.

15. The starter generator of claim 9, further comprising:
a DC power source electrically coupled in series with the main rotor when the main rotor is configured as an N-pole rotor.

16. The starter-generator of claim 9, wherein M is unequal to N.

17. The starter-generator of claim 16, wherein N=(M/2).

18. A rotor for a gas turbine engine starter-generator, comprising:
a main rotor body; and
a plurality of rotor coils wound around at least a portion of the main body,
wherein the rotor coils are wound in a configuration that allows the rotor to be selectively configured as an M-pole rotor or an N-pole rotor.

19. The rotor of claim 18, further comprising:
a switch electrically coupled between selected ones of the rotor coils and having at least a first position and a second position.

20. The rotor of claim 19, wherein the rotor is configured as the M-pole rotor with the switch in the first position, and is configured as the N-pole rotor with the switch in the second position.

21. The rotor of claim 19, wherein M is unequal to N.

22. The rotor of claim 21, wherein N=(M/2).

23. A gas turbine engine starter-generator selectively configured to operate in either a motor mode or a generate mode, the starter-generator comprising:
a housing;
a main stator mounted within the housing and having a single set of stator windings wound thereon; and
a main rotor mounted within the housing and located at least partially within at least a portion of the main stator, the main rotor (i) electrically isolated from the main stator and configured as an M-pole rotor when the starter-generator is configured to operate in the motor mode and (ii) electrically isolated from the main stator and configured as an N-pole rotor when the starter-generator is configured to operate in the generate mode.

24. In a motor/generator including a stator having a plurality of stator windings wound around at least a portion thereof and a rotor having a plurality of rotor windings wound around at least a portion thereof, a method of operating the motor/generator, comprising:
electrically coupling at least a portion of the rotor windings together such that the main rotor is configured as an N-pole rotor;
supplying DC power from a first DC power source to the electrically coupled rotor windings and DC power from a second DC power source to the stator windings, to thereby operate the motor/generator as a DC motor; and
electrically coupling at least a portion of the rotor windings together such that the main rotor is configured as an M-pole rotor and no longer supplying DC power to the stator windings, to thereby operate the motor/generator as an AC generator.

25. In a motor/generator including a stator having a plurality of stator windings wound around at least a portion thereof and a rotor having a plurality of rotor windings wound around at least a portion thereof, a method of operating the motor/generator, comprising:
electrically coupling at least a portion of the rotor windings together such that the main rotor is configured as an N-pole rotor;
supplying DC power to the electrically coupled rotor windings and to the stator windings, to thereby operate the motor/generator as a DC motor; and
electrically coupling at least a portion of the rotor windings together such that the main rotor is configured as an M-pole rotor and no longer supplying DC power to the stator windings, to thereby operate the motor/generator as an AC generator.

26. The method of claim 25, wherein the motor/generator further includes at least two brushes that are selectively electrically coupled to, and decoupled from, the rotor windings, the method further comprising:
electrically coupling the brushes to the rotor windings when operating the motor/generator as a DC motor; and
electrically decoupling the brushes from the from rotor windings when operating the motor/generator as an AC generator.

27. The method of claim 25, wherein the motor/generator changes from operation as a DC motor to an AC generator when its rotational speed reaches a predetermined magnitude.

28. The method of claim 25, wherein the motor/generator changes from operation as a DC motor to an AC generator a predetermined time after commencing operation as a DC motor.

* * * * *